Patented Mar. 30, 1926.

1,579,090

UNITED STATES PATENT OFFICE.

CAMILLE DEGUIDE, OF ENGHIEN, FRANCE.

PROCESS FOR THE TREATMENT OF MOLASSES AND SUGARY JUICES WITH A VIEW TO THE RECOVERY OF THE SUGAR.

No Drawing.   Application filed November 3, 1925. Serial No. 66,684.

*To all whom it may concern:*

Be it known that I, CAMILLE DEGUIDE, a subject of the King of Belgium, and a resident of Enghien, Department of Seine and Oise, France, have invented new and useful Improvements in Processes for the Treatment of Molasses and Sugary Juices with a View to the Recovery of the Sugar, of which the following is a specification.

The present invention relates to a process for the treatment of molasses and sugary juices, in particular cane sugar molasses, with a view to the recovery of the sugar.

Hitherto it has been proposed to destroy and precipitate the reducing sugars (glucose and levulose) and the gums, or other substances contained in these molasses or sugary juices, by treating the latter with caustic lime, baryta or strontia, before treating the filtrate, freed from these impurities, in the known manner with baryta or caustic lime, in order to obtain a saccharate of barium or calcium, which is then treated with carbonic acid with a view to the recovery of the saccharose. These processes are based upon the fact that the reducing sugars, the gums and other organic impurities have a greater affinity than saccharose for baryta, caustic lime and strontia.

The present invention consists in precipitating and destroying the impurities contained in these molasses and sugary juices, in particular the reducing sugars (glucose and levulose) and the gums contained in the molasses of cane sugar, by monobarytic silicate ($SiO^2.BaO$) or the silicate intermediate between the mono and bibarytic silicates ($2SiO^2.3BaO$), before precipitating the saccharose in known manner.

The use of the monobarytic silicate ($SiO^2.BaO$) or of the intermediate silicate ($2SiO^2.3BaO$) presents the advantage that these bodies do not act upon saccharose whereas they destroy and precipitate glucose, levulose, gums and other organic substances contained in cane-sugar molasses, as well as the organic impurities contained in molasses and sugary juices.

On the contrary, caustic lime, baryta, and strontia, which have hitherto been employed for the same purpose, present the disadvantage of acting likewise upon saccharose, so that it is necessary to proportion exactly the quantity of lime, baryta or strontia, added to the molasses or sugary juice, as otherwise a part of the saccharose is likewise precipitated in the form of saccharate during this preliminary purification and is lost for the recovery of the sugar; in spite of all precautions, there is always a loss of saccharose when using baryta, caustic lime or strontia for this preliminary separation.

With the monobarytic silicate or the silicate intermediate between the mono and bibarytic silicates, there is no necessity to proceed with such precaution; even an excess of these bodies would exert no action upon the saccharose. Only the impurities are precipitated or destroyed; the saccharose can be filtered and collected entirely free from glucose, levulose, gums and other organic substances.

For this destruction and precipitation of the impurities contained in the molasses and sugary juices, there might likewise be employed a more basic silicate of barium, for example bibarytic silicate ($SiO^2.2BaO$), which would act in the same way upon the reducing sugars and the organic impurities; but in this case there would be encountered the disadvantage inherent to baryta, caustic lime and strontia, viz that the saccharose, as soon as the reducing sugars, gums and other impurities had been destroyed and precipitated by these substances, would likewise be precipitated in its turn and would be lost. This is due to the proportion of baryta contained in these more basic barytic silicates, whereas no effect of this kind is experienced with the monobarytic silicate and the silicate intermediate between the mono and bibarytic silicates.

The silicates may for example be prepared as follows:

(*a*) By calcining in the furnace a mixture of silica and carbonate of barium in the requisite proportions:

(1)   $SiO^2+BaCO^3=SiO^2.BaO+CO^2$
(2) or $2SiO^2.3BaCO^3=2SiO^2.3BaO+3CO^2$.

(*b*) By decomposing with hot water the bibarytic silicate or a more basic silicate of barium, as indicated in my United States Letters Patent No. 1,247,510 of November 20, 1917, and No. 1,490,769 of April 15, 1924.

(3) $SiO^2.2BaO + H^2O = SiO^2.BaO + Ba(OH)^2$.

(4) or $2(SiO^2.2BaO) + H^2O = 2SiO^2.3BaO + Ba(OH)^2$.

(5) $SiO^2.3BaO + 2H^2O = SiO^2.BaO + 2Ba(OH)^2$.

(6) or $2(SiO^2.3BaO) + 3H^2O = 2SiO^2.3BaO + 3Ba(OH)^2$.

Any other suitable method might likewise be employed for preparing this monobarytic silicate or the silicate intermediate between the mono and bibarytic silicates. It is however preferable to use the product of the decomposition of bibarytic silicate or of a more basic barytic silicate (according to equations 3, 4, 5 and 6) in cases where the baryta, necessary to the extraction of the sugar from the molasses and sugary juices (by obtaining barium saccharate and decomposing the latter by carbonic acid), is prepared by the methods described in the patent specifications mentioned above.

*Example.*

The monobarytic silicate ($SiO^2.BaO$) or the intermediate silicate ($2SiO^2.3BaO$), in a finely divided state, is mixed with about its own weight of water; it is caused to act upon the cane-sugar molasses, in proportions such that there are about one and a half molecules of baryta (BaO), in the combined state in the silicate, to every one molecule of reducing sugars (glucose and levulose) in the cane-sugar molasses. The temperature is raised to about 85° centigrade, and the contact is allowed to last for about four hours; the impurities are removed by filtration; the filtrate, which contains the saccharose, is treated in known manner first with a solution of caustic baryta ($Ba(OH)^2$) in order to obtain a saccharate of barium, which after filtration is decomposed by carbonic acid into saccharose and barium carbonate.

The impurities contained in the precipitate and consisting of gelatinous silica, unattacked silicates of barium, and organic compounds of barium, may be returned to the furnace after a sufficient quantity of barium carbonate has been added to them for regenerating the barytic silica first utilized.

Preferably, there is regenerated in this way the bibarytic silicate or a more basic silicate; the latter will be again decomposed by water according to equations 3, 4, 5 or 6; the caustic baryta ($Ba(OH)^2$) thus produced will be used for obtaining saccharose, while the insoluble product consisting of monobarytic silicate, in the case of equations 3 and 5, or of an intermediate silicate, in the case of equations 4 and 6, will serve for a fresh operation of purifying the sugary juice.

It is to be understood that in the appended claims, the term "monobarytic silicate" is intended to designate, not only the monobarytic silicate proper ($SiO^2.BaO$), but also the barytic silicate ($2SiO^2.3BaO$) intermediate between the mono- and bibarytic silicates.

What I claim is:

1. In a process for the treatment of molasses and sugary juices, with a view to the recovery of the sugar contained therein, the step consisting in precipitating and destroying the organic impurities contained in said molasses and sugary juices, by monobarytic silicate, before recovering the saccharose.

2. In a process for the treatment of cane-sugar molasses, with a view to the recovery of the sugar contained therein, the step consisting in precipitating and destroying the reducing sugars (glucose and levulose), the gums and other organic impurities contained in said molasses, by monobarytic silicate, before recovering the saccharose.

In testimony whereof I have signed my name to this specification.

CAMILLE DEGUIDE.